US011466927B2

(12) United States Patent
Deka et al.

(10) Patent No.: US 11,466,927 B2
(45) Date of Patent: *Oct. 11, 2022

(54) HERMETICALLY SEALED OVERMOLDED PLASTIC THERMAL BRIDGE BREAKER WITH REFRIGERATOR CABINET LINER AND WRAPPER FOR VACUUM INSULATION

(71) Applicant: WHIRLPOOL CORPORATION, Benton Harbor, MI (US)

(72) Inventors: Lakshya J. Deka, Mishawaka, IN (US); Dustin M. Miller, South Bend, IN (US); Tao Liu, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 38 days.

This patent is subject to a terminal disclaimer.

(21) Appl. No.: 17/064,710

(22) Filed: Oct. 7, 2020

(65) Prior Publication Data
US 2021/0018255 A1 Jan. 21, 2021

Related U.S. Application Data

(63) Continuation of application No. 16/309,670, filed as application No. PCT/US2016/049449 on Aug. 30, 2016, now Pat. No. 10,830,527.

(51) Int. Cl.
*F25D 23/06* (2006.01)
*F25D 23/08* (2006.01)
(Continued)

(52) U.S. Cl.
CPC .......... *F25D 23/066* (2013.01); *F16L 59/065* (2013.01); *F25D 23/06* (2013.01);
(Continued)

(58) Field of Classification Search
CPC ...... F25D 23/066; F25D 23/06; F25D 23/085; F25D 23/08; F25D 23/082; F25D 23/064;
(Continued)

(56) References Cited

U.S. PATENT DOCUMENTS 2,661,117 A 12/1953 Wallenbrock et al.
2,679,944 A 6/1954 Morton
(Continued)

FOREIGN PATENT DOCUMENTS

CA 1110151 A 8/2006
DE 9204365 U1 7/1992
(Continued)

*Primary Examiner* — Daniel J Troy
*Assistant Examiner* — Timothy M Ayres
(74) *Attorney, Agent, or Firm* — Price Heneveld LLP (57) ABSTRACT

A vacuum insulated cabinet structure includes an exterior wrapper with a front edge extending around an opening thereof. A liner includes a front edge extending around an opening of the liner, wherein the liner is disposed inside of the wrapper. A thermal bridge includes an outer coupling portion and an inner coupling portion. In assembly, the outer coupling portion is overmolded to the front edge of the wrapper, and the inner coupling portion is overmolded to the front edge of the liner to form a sealed vacuum cavity (VC) between the wrapper and the liner. The thermal bridge is formed in a mold in which the wrapper and liner are partially disposed to form a unitary composite structure.

20 Claims, 11 Drawing Sheets

(51) Int. Cl.
*F16L 59/065* (2006.01)
*F25D 11/02* (2006.01)

(52) U.S. Cl.
CPC ............ *F25D 23/085* (2013.01); *F25D 11/02* (2013.01); *F25D 23/064* (2013.01); *F25D 2201/14* (2013.01); *F25D 2400/04* (2013.01)

(58) Field of Classification Search
CPC .. F25D 11/02; F25D 2201/14; F25D 2400/04; F16I 59/065
USPC ................................................ 312/406, 406.2
See application file for complete search history.

(56) References Cited

U.S. PATENT DOCUMENTS

| | | |
|---|---|---|
| 2,809,764 A | 10/1957 | Diamond |
| 2,989,156 A | 6/1961 | Brooks et al. |
| 3,338,451 A | 8/1967 | Kesling |
| 3,380,615 A | 4/1968 | Kessler |
| 3,633,783 A | 1/1972 | Aue |
| 4,218,203 A | 8/1980 | Tilgner |
| 4,732,432 A | 3/1988 | Keil et al. |
| 4,834,471 A | 5/1989 | Pasqualini |
| 5,289,657 A | 3/1994 | Kiel |
| 5,720,536 A | 2/1998 | Jenkins et al. |
| 6,120,720 A | 9/2000 | Meier et al. |
| 6,174,482 B1 | 1/2001 | Reames et al. |
| 6,485,122 B2 | 11/2002 | Wolf et al. |
| 6,725,624 B2 | 4/2004 | Hirath et al. |
| 6,773,652 B2 | 8/2004 | Loy et al. |
| 7,197,888 B2 | 4/2007 | LeClear et al. |
| 7,665,326 B2 | 2/2010 | LeClear et al. |
| 8,336,975 B2 | 12/2012 | Allard et al. |
| 8,658,269 B1 | 2/2014 | Parkes et al. |
| 8,709,313 B2 | 4/2014 | Fiorentini et al. |
| 9,170,046 B2 | 10/2015 | Jung et al. |
| 10,092,104 B2 | 10/2018 | Selvan et al. |
| 10,473,217 B2 | 11/2019 | Deka et al. |
| 10,830,527 B2 * | 11/2020 | Deka ..................... F25D 23/085 |
| 2009/0031659 A1 | 2/2009 | Kalfon |
| 2014/0346942 A1 | 11/2014 | Kim et al. |
| 2015/0027628 A1 | 1/2015 | Cravens et al. |
| 2015/0352816 A1 | 12/2015 | Wang et al. |
| 2016/0258671 A1 | 9/2016 | Allard et al. |
| 2017/0190081 A1 | 7/2017 | Naik et al. |
| 2019/0101320 A1 | 4/2019 | Dherde et al. |
| 2019/0128594 A1 | 5/2019 | Allard et al. |
| 2019/0162465 A1 | 5/2019 | Allard et al. |
| 2019/0170174 A1 | 6/2019 | Deka et al. |
| 2019/0170431 A1 | 6/2019 | Naik et al. |
| 2019/0310011 A1 | 10/2019 | Marinello et al. |

FOREIGN PATENT DOCUMENTS

| | | |
|---|---|---|
| EP | 0997262 A1 | 5/2000 |
| EP | 1744114 A2 | 1/2007 |
| EP | 2765376 A2 | 8/2014 |
| WO | 2010132339 A1 | 11/2010 |

* cited by examiner

HERMETICALLY SEALED OVERMOLDED PLASTIC THERMAL BRIDGE BREAKER WITH REFRIGERATOR CABINET LINER AND WRAPPER FOR VACUUM INSULATION

CROSS-REFERENCED TO RELATED APPLICATION

This application is a continuation of U.S. patent application Ser. No. 16/309,670, filed on Dec. 13, 2018, entitled HERMETICALLY SEALED OVERMOLDED PLASTIC THERMAL BRIDGE BREAKER WITH REFRIGERATOR CABINET LINER AND WRAPPER FOR VACUUM INSULATION, which a U.S. National Stage of PCT/US2016/049449 filed on Aug. 30, 2016, which is hereby incorporated by reference.

BACKGROUND

The present device generally relates to insulated structures, in particular, to a vacuum insulated refrigerator cabinet that includes a thermal bridge breaker that is overmolded to and interconnects a wrapper and a liner.

Various types of insulated refrigerator cabinet structures have been developed. One type of insulated structure includes a wrapper and a liner. The wrapper and liner are generally spaced-apart to form a cavity therebetween that is filled with an insulating material. In a vacuum insulated refrigerator structure, this cavity may be filled with a vacuum insulated core material. In order to hold the vacuum, it is necessary to provide an airtight seal between the wrapper, one or more liners, and the thermal bridge breaker.

SUMMARY

In at least one aspect, the present concept includes an overmolded composite structure having an exterior wrapper with an opening that opens into a cavity and a front edge extending around the opening. At least one liner has an opening that opens into a compartment and also includes a front edge extending around the opening of the liner. The liner is disposed inside the cavity of the wrapper with the front edge of the wrapper disposed outwardly relative to the front edge of the liner. A vacuum cavity is formed between the wrapper and the liner. A thermal bridge includes an outer coupling portion and at least one inner coupling portion, wherein outer coupling portion is overmolded to at least a portion of the front edge of the wrapper, and further wherein the inner coupling portion is overmolded to at least a portion of the front edge of the liner to form a sealed vacuum cavity between the wrapper and the liner.

In at least another aspect, the present concept includes a vacuum insulated cabinet structure having an exterior wrapper with a front edge extending around an opening thereof. At least one liner includes a front edge extending around an opening of the liner, wherein the liner is disposed inside of the wrapper with the front edge of the wrapper disposed around the front edge of the liner in assembly. A thermal bridge includes an outer coupling portion and at least one inner coupling portion. In assembly, the outer coupling portion is overmolded to at least a portion of the front edge of the wrapper, and the inner coupling portion is overmolded to at least a portion of the front edge of the liner to form a sealed vacuum cavity between the wrapper and the liner.

In yet another aspect, the present concept includes a method of making a cabinet structure, wherein the method includes the following steps: a) forming a wrapper from a sheet of material whereby the wrapper has an opening and a front edge extending around the opening; b) forming a first liner from a sheet of material whereby the first liner has an opening and a front edge extending around the opening of the first liner; c) forming a second liner from a sheet of material whereby the second liner has an opening and a front edge extending around the opening of the second liner; d) providing a mold having a body portion with an outer channel and first and second inner channels opening into a mold cavity disposed within an interior of the body portion, the mold cavity having an inverse configuration of a thermal bridge; e) positioning the front edge of the first liner in the first inner channel of the mold whereby the front edge of the first liner is partially disposed within the mold cavity of the mold through the first inner channel of the mold; f) positioning the front edge of the second liner in the second inner channel of the mold whereby the front edge of the second liner is partially disposed within the mold cavity of the mold through the second inner channel of the mold; g) positioning the front edge of the wrapper in the outer channel of the mold whereby the front edge of the wrapper is partially disposed within the mold cavity of the mold through the outer channel of the mold; h) introducing a resin mixture into the mold cavity to substantially fill the mold cavity; and i) forming a thermal bridge from the resin mixture within the mold cavity, the thermal bridge including an outer coupling portion overmolded to a portion of the front edge of the wrapper, a first inner coupling portion overmolded to a portion of the front edge of the first liner, and a second inner coupling portion overmolded to a portion of the front edge of the second liner.

These and other features, advantages, and objects of the present device will be further understood and appreciated by those skilled in the art upon studying the following specification, claims, and appended drawings.

DETAILED DESCRIPTION OF EMBODIMENTS

Figure 1:
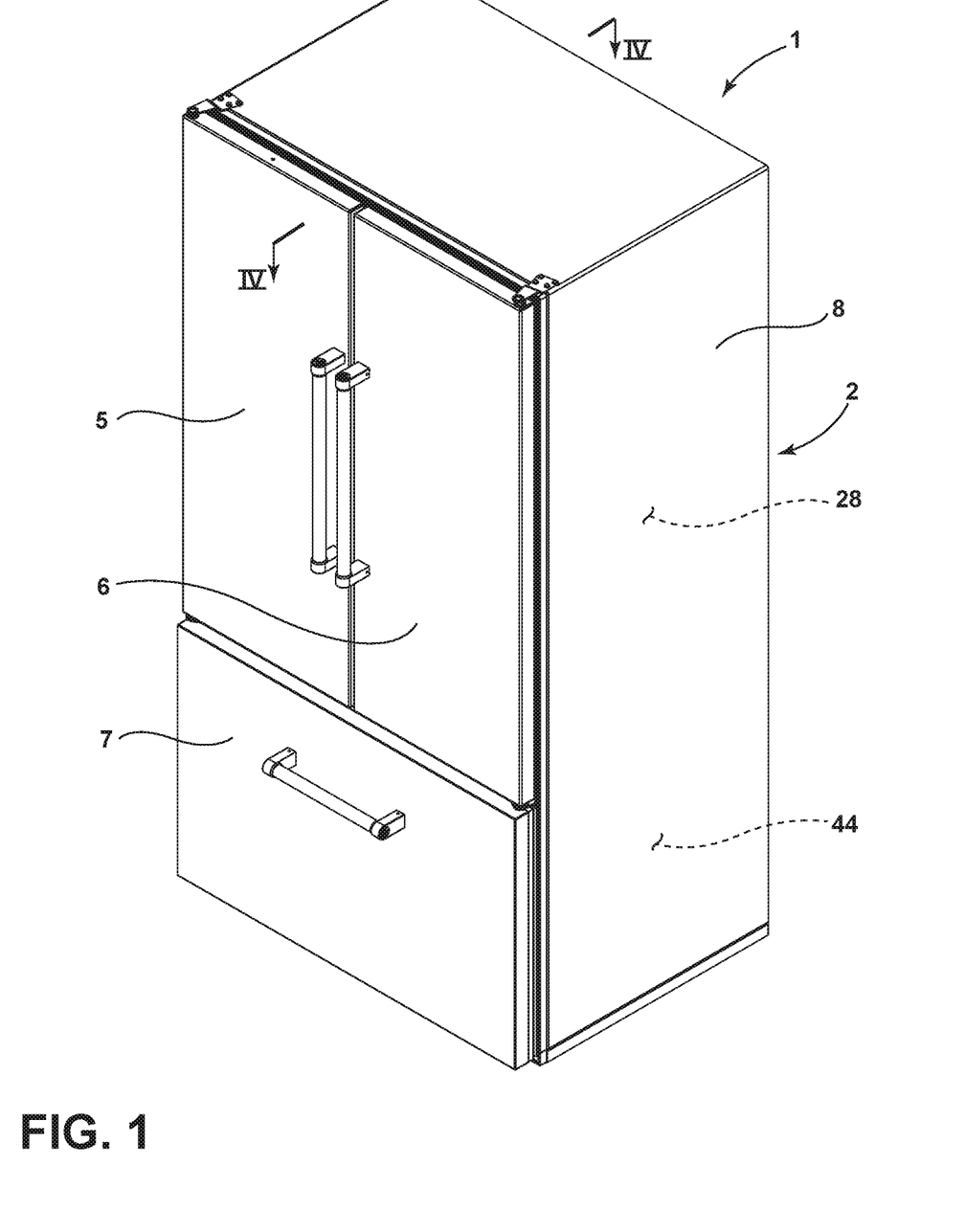
FIG. 1 is isometric view of a refrigerator including a vacuum insulated cabinet structure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a refrigerator 1 includes a vacuum insulated cabinet structure 2 which further includes a refrigerator compartment 28 and a freezer compartment 44. Doors 5 and 6 are provided to selectively provide access to the refrigerator compartment 28, while a drawer 7 is used to provide access to the freezer compartment 44. The vacuum insulated cabinet structure 2 is surrounded by an exterior wrapper 8 in assembly. The configuration of the refrigerator 1 is exemplary only and the present concept is contemplated for use in all refrigerator styles including, but not limited to, side-by-side refrigerators, whole refrigerator and freezers, and refrigerators with upper freezer compartments.

Figure 2:
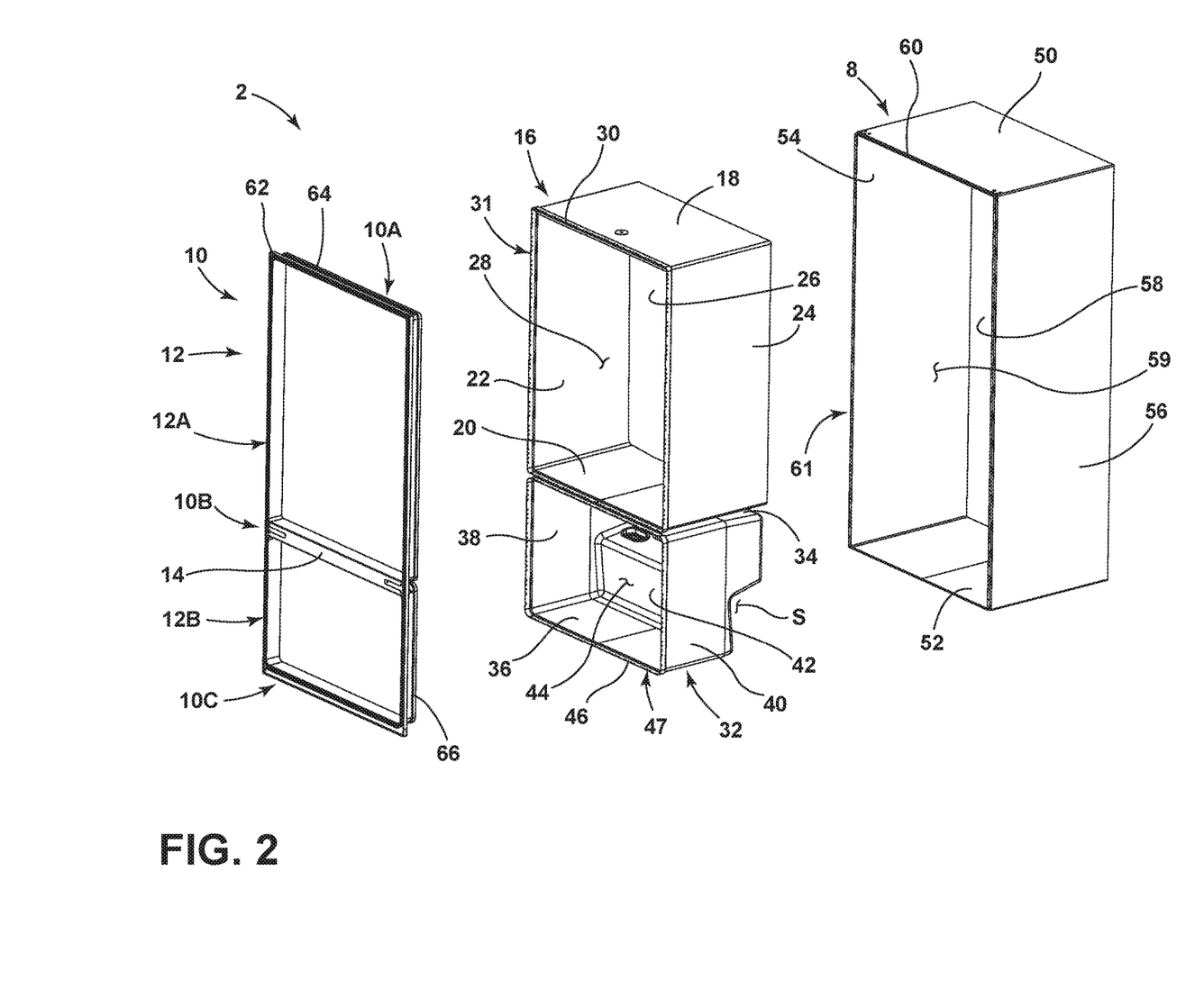
FIG. 2 is an exploded isometric view of a vacuum insulated refrigerator cabinet structure.

Referring now to FIG. 2, the vacuum insulated cabinet structure 2 generally includes a thermal bridge 10 that includes a frame 12 having an upper opening 12A and a lower opening 12B with a mullion portion 14 disposed therebetween. The thermal bridge 10 includes an upper portion 10A, a middle portion 10B and a lower portion 10C. The vacuum insulated cabinet structure 2 further includes a refrigerator liner 16 having a top wall 18, bottom wall 20, opposed sidewalls 22, 24, and a rear wall 26 which cooperate to define a refrigerator compartment 28. The refrigerator liner 16 further includes a front edge 30 disposed on a front portion of the refrigerator compartment 28 along the top wall 18, bottom wall 20 and opposed sidewalls 22, 24 in a quadrilateral ring configuration. Similarly, a freezer liner 32 includes a top wall 34, a bottom wall 36, opposed sidewalls 38, 40, and a rear wall 42 which all cooperate to define a freezer compartment 44. The rear wall 42 is a contoured rear wall that provides a spacing S for housing cooling components for cooling both the refrigerator compartment 28 and freezer compartment 44. Such components may include a compressor, a condenser, an expansion valve, an evaporator, a plurality of conduits, and other related components used for cooling the refrigerator and freezer compartments 28, 44. The freezer liner 32 further includes a front edge 46 disposed at a front portion of the freezer compartment 44 which is disposed along the top wall 34, bottom wall 36 and opposed sidewalls 38, 40 in a quadrilateral ring configuration. In assembly, the front edge 30 of the refrigerator liner 16 and the front edge 46 of the freezer liner 32 define first and second openings 31, 47 that are configured to couple with coupling portions disposed about the upper and lower openings 12A, 12B of the thermal bridge 10, as further described below.

As further shown in FIG. 2, the vacuum insulated cabinet structure 2 further includes the exterior wrapper 8 which includes a top wall 50, a bottom wall 52, opposed sidewalls 54, 56, and a rear wall 58 which cooperate to define a cavity 59. The wrapper 8 further includes a front edge 60 which is disposed along an opening 61 of the cavity 59 which is further disposed along the top wall 50, bottom wall 52 and opposed sidewalls 54, 56 so as to be a circumventing frontmost edge 60 of the exterior wrapper 8 presented in a quadrilateral ring configuration. In assembly, the front edge 60 of the exterior wrapper 8 is coupled to coupling portions of the thermal bridge 10 around the liners 16, 32. In this way, the thermal bridge 10 interconnects the exterior wrapper 8 and the refrigerator liner 16 and the freezer liner 32 when assembled. Further, the refrigerator liner 16 and freezer liner 32 are received within the cavity 59 of the exterior wrapper 8 when assembled, such that there is a spacing between the outer surfaces of the refrigerator liner 16 and the freezer liner 32 relative to the inner surfaces of the exterior wrapper 8. In this way, the spacing can be used to create a vacuum insulated space as further described below.

The wrapper 8 may be made from sheet metal, polymer materials, or other suitable materials. If the wrapper 8 is made from sheet metal, the wrapper 8 may be formed utilizing known steel forming tools and processes. Alternatively, the wrapper 8 may be formed from a polymer material. For example, the wrapper 8 may be fabricated by thermoforming a sheet of thermoplastic polymer material. The wrapper 8 may be constructed of a material that is substantially impervious, such that oxygen, nitrogen, carbon dioxide, water vapor, and/or other atmospheric gasses are sealed out of the vacuum cavity VC (FIG. 3) defined in the spacing or gap that is formed between the wrapper 8 and liners 16, 32 as discussed in more detail below. If the wrapper 8 is formed from a polymer material, the polymer material may comprise a plurality of layers, wherein the layers of material are selected to provide impermeability to gasses.

The refrigerator liner 16 and the freezer liner 32 are preferably made from a sheet metal material utilizing known steel forming tools and processes. The liners 16, 32 may otherwise be formed from a polymer material in the form of a polymer sheet that is thermoformed. The polymer material may comprise one or more layers of material that are selected to provide impermeability to gasses. The liners 16, 32 may optionally include a plurality of reinforcing structures, such as vertically spaced ridges or other forms for supporting dividers within the refrigerator compartment 28 or freezer compartment 44. Examples of layered polymer materials that may be utilized to construct the wrapper 8 or liners 16, 32 are disclosed in U.S. patent application Ser. No. 14/980,702, entitled "MULTILAYER BARRIER MATERIALS WITH PVD OR PLASMA COATING FOR VACUUM INSULATED STRUCTURE," and U.S. patent application Ser. No. 14/980,778, entitled "MULTI-LAYER GAS BARRIER MATERIALS FOR VACUUM INSULATED STRUCTURE," filed on Dec. 28, 2015, the entire contents of which are incorporated by reference. Specifically, the wrapper 8 and/or liners 16, 32 may be thermoformed from a tri-layer sheet of polymer material comprising first and second outer structure layers and a central barrier layer that is disposed between the outer layers. The outer layers and the barrier layer may comprise thermoplastic polymers. The barrier layer may optionally comprise an elastomeric material. The outer layers and the barrier layer may be coextruded or laminated together to form a single multi-layer sheet prior to thermoforming. The outer layers or walls of the wrapper 8 and liners 16, 32 are contemplated to have a thickness of about 0.1 mm to 10 mm, and the barrier layer(s) are contemplated to have a thickness of about 0.1 mm to 10 mm.

As shown in FIG. 2, the front edge 30 of the refrigerator liner 16 includes linear portions disposed around the top wall 18, bottom wall 20 and opposed sidewalls 22, 24 at front portions thereof, such that front edge 30 of the refrigerator liner 16 is generally quadrilateral. As further shown in FIG. 2, the front edge 46 of the freezer liner 32 includes linear portions disposed around the top wall 34, bottom wall 36 and opposed sidewalls 38, 40 at front portions thereof, such that front edge 46 of the freezer liner 32 is also generally quadrilateral. As depicted in FIG. 2 and further shown in FIG. 3, the profile of the combination of the liners 16, 32 is preferably somewhat smaller than the profile of the wrapper 8 to thereby form the vacuum cavity VC (FIG. 3) within the spacing defined between the liners 16, 32 and the wrapper 8 when the liners 16, 32 are positioned inside the cavity 59 of the wrapper 8. The vacuum cavity VC is configured to receive an insulating material (not shown) that may be described as a vacuum core material. The vacuum core material may comprise a plurality of preformed individual core panels that are preformed and positioned between wrapper 8 and the liners 16, 32 during assembly prior to the formation of the thermal bridge 10 which is overmolded to portions of the wrapper 8 and the liners 16, 32 as further described below. Alternatively, the vacuum core material may comprise silica powder or other suitable loose filler material that is inserted (e.g. blown) into the vacuum cavity VC after wrapper 8, liners 16, 32, and thermal bridge 10 are formed into a unitary composite structure.

As configured in assembly, the front edges 30, 46 of the liners 16, 32 are spaced-apart from each other at the linear portion disposed along the bottom wall 20 of the refrigerator liner 16 and the linear portion disposed along the top wall 34 of the freezer liner 32. Further, the front edges 30, 46 of the liners 16, 32 disposed along the opposed sidewalls 22, 24 and 38, 40 of the liners 16, 32, and the top wall 18 of the refrigerator liner 16 and the bottom wall 36 of the freezer liner 32 are spaced-apart from the linear portions defining the front edge 60 of the wrapper 8 in assembly.

Figure 3:
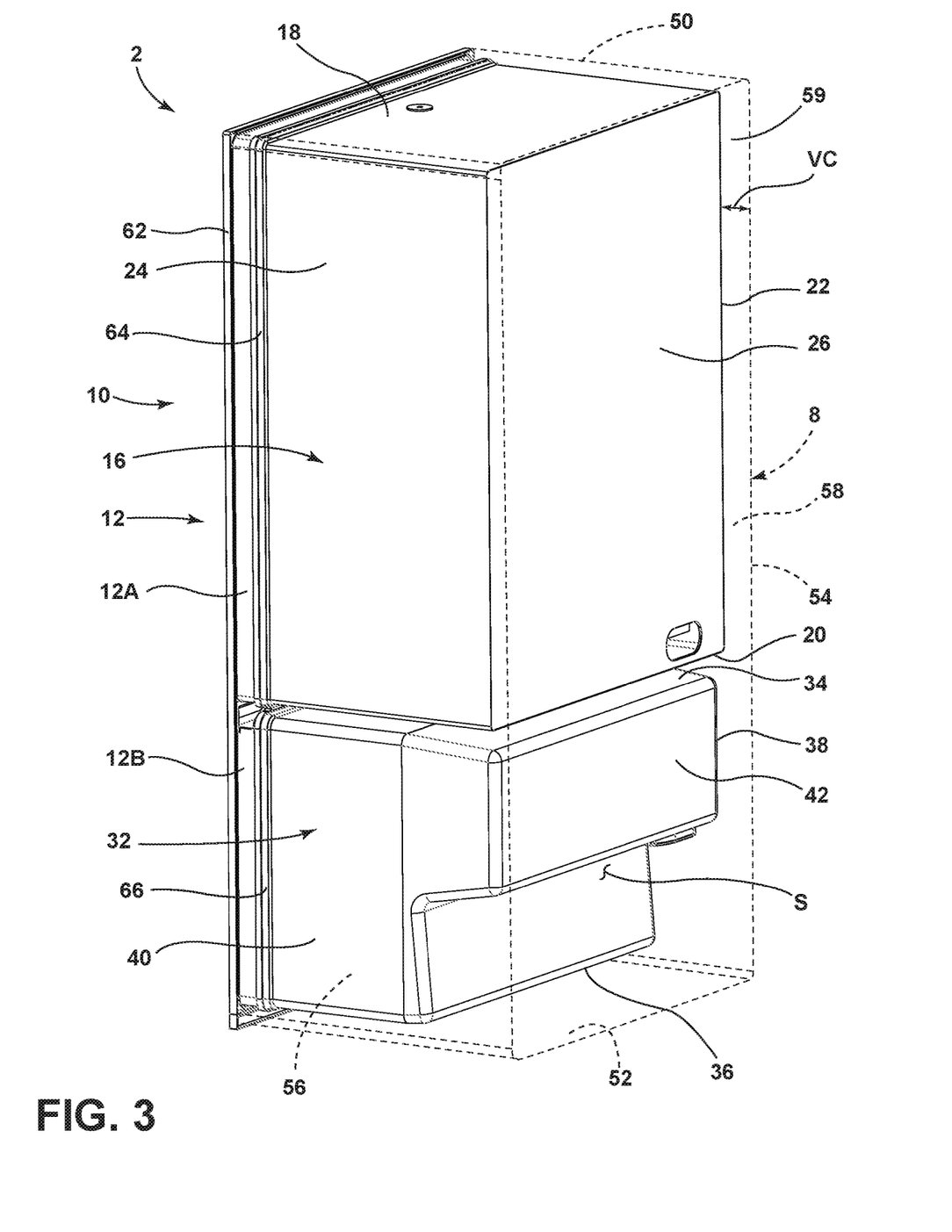
FIG. 3 is a rear isometric view of the vacuum insulated refrigerator cabinet structure of FIG. 2 as assembled.

When the vacuum insulated cabinet structure 2 is assembled, as shown in FIG. 3, the thermal bridge 10 connects to the front edge 60 of the wrapper 8, to the front edge 30 of the refrigerator liner 16, and to the front edge 46 of the freezer liner 32 to thereby interconnect the wrapper 8 and the liners 16, 32 into an overmolded composite structure. The thermal bridge 10 may be formed from a suitable material that is substantially impervious to gasses to maintain a vacuum in the vacuum cavity VC, and also having a low coefficient of thermal conductivity to reduce or prevent transfer of heat between the wrapper 8 and the liners 16, 32. For use with the present concept, the thermal bridge 10 is preferably formed utilizing a molding process, and specifically, may include a reaction injection molding (RIM) process as further described below. In an RIM process, the thermal bridge 10 is likely formed in a mold using a polyurethane material. Other materials suitable for an RIM process may include, but are not limited to, polyureas, polyisocyanurates, polyesters, polyphenols, polyepoxides, thermoplastic elastomers, polycarbonate, and nylon materials. Using an RIM process of the present concept, the thermal bridge 10 is overmolded to the refrigerator liner 16, the freezer liner 32 and wrapper 8 at the front edges 30, 46, 60, respectively, thereof. In this way, the vacuum insulated cabinet structure 2 can be a unitary part after the thermal bridge 10 is cast onto the front edges 30, 46, 60, of the liners 16, 32 and the wrapper 8.

When refrigerator 1 (FIG. 1) is in use, the wrapper 8 is typically exposed to ambient room temperature air, whereas the liners 16, 32 are generally exposed to refrigerated air in the refrigerator compartment 3 or the freezer compartment 4. With the thermal bridge 10 being made of a material that is substantially non-conductive with respect to heat, the thermal bridge 10 reduces transfer of heat from the wrapper 8 to the liners 16, 32.

Thermal bridge 10 may include linear portions that are interconnected to form a ring-like structure having a quadrilateral perimeter or outer coupling portion 62 and upper and lower quadrilateral inner coupling portions 64, 66. The upper and lower inner coupling portions 64, 66 define upper and lower openings 12A, 12B that generally correspond to the openings 31, 47 defined by the front edges 30, 46 of the refrigerator liner 16, and freezer liner 32 of the cabinet structure 2. In assembly, the outer coupling portion 62 is overmolded to the front edge 60 of the wrapper 8. Further, the inner coupling portions 64, 66 are disposed inside of the outer coupling portion 62 and set back therefrom, as further described below. In assembly, the upper and lower inner coupling portions 64, 66 are overmolded to the front edges 30, 46 of the refrigerator liner 16, and freezer liner 32, respectively. It will be understood that the thermal bridge 10 may have various shapes and configurations as may be required for a particular application, and it is further contemplated that the thermal bridge 10 can be used in a refrigerator having multiple liners (as shown in FIG. 2 with a refrigerator liner and a freezer liner) or in a refrigerator having a single liner for use as a refrigerator or freezer only.

Figure 4:
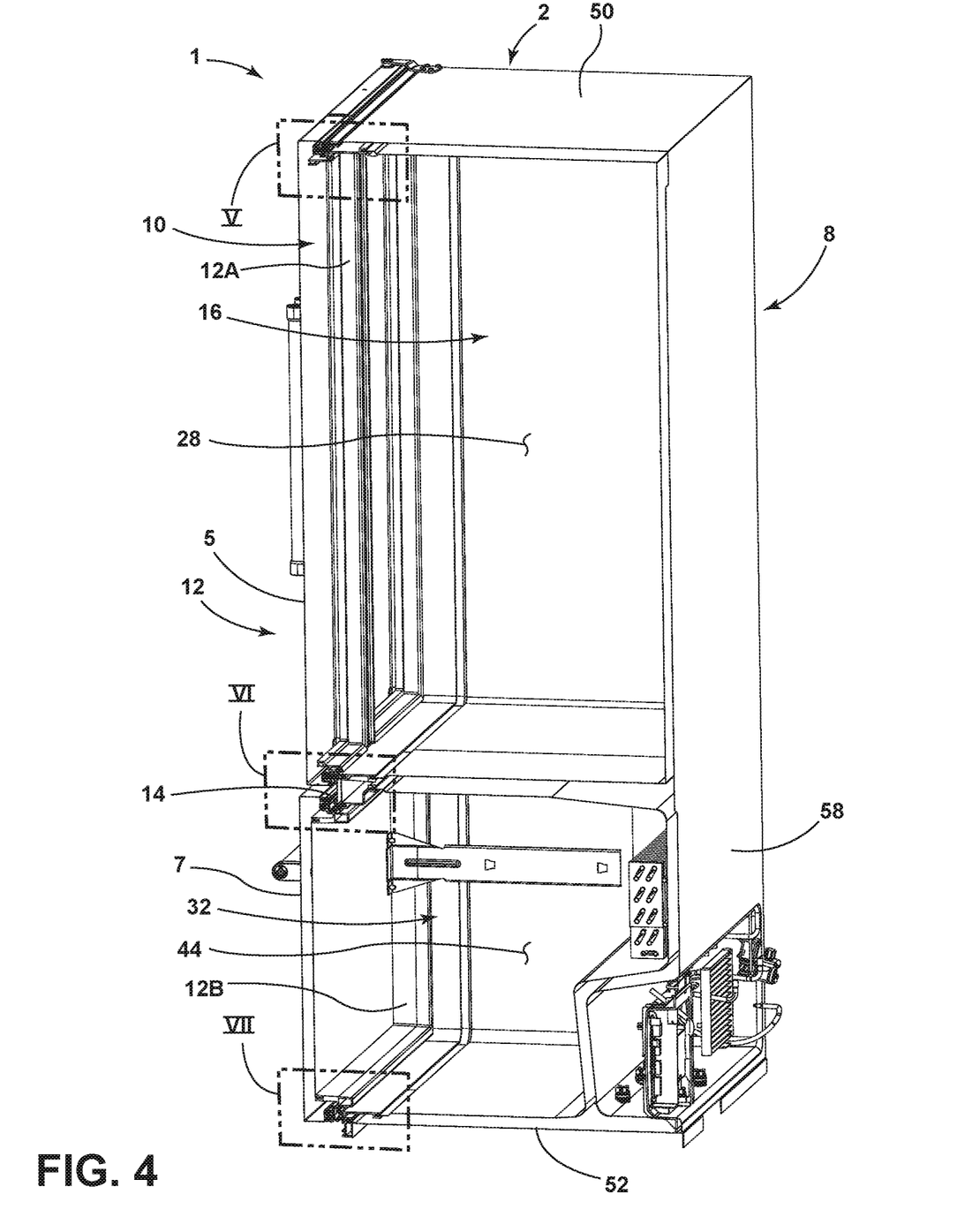
FIG. 4 is a cross-sectional view of the refrigerator cabinet of FIG. 1 taken at line IV.

Referring now to FIG. 4, the refrigerator 1 is shown in a cross-sectional view having the refrigerator liner 16 and freezer liner 32 coupled to the thermal bridge 10 at upper and lower openings 12A, 12B, respectively. Further, the wrapper 8 is also coupled to the thermal bridge 10, such that the thermal bridge 10 interconnects the wrapper 8 with the refrigerator liner 16 and freezer liner 32. Specifically, the thermal bridge 10 of the present concept is overmolded to the liners 16, 32 and wrapper 8 to hermetically seal the components together as a unitary whole as shown in FIG. 3. As used herein, the term "overmolded" and/or "overmolding" refers to a process by which one thermoplastic material is molded over another material(s) to form a unitary part. In an overmolding process of the present concept, a first component (or multiple components) are formed and placed in a mold. After positioning the first component in the mold, a second component is injected into and molded in the mold that already contains the first component. In this way, the first and second components are adhered to each other over at least a portion of a surface of the first component. The overmolding process of the present concept is further described below.

Figure 5:
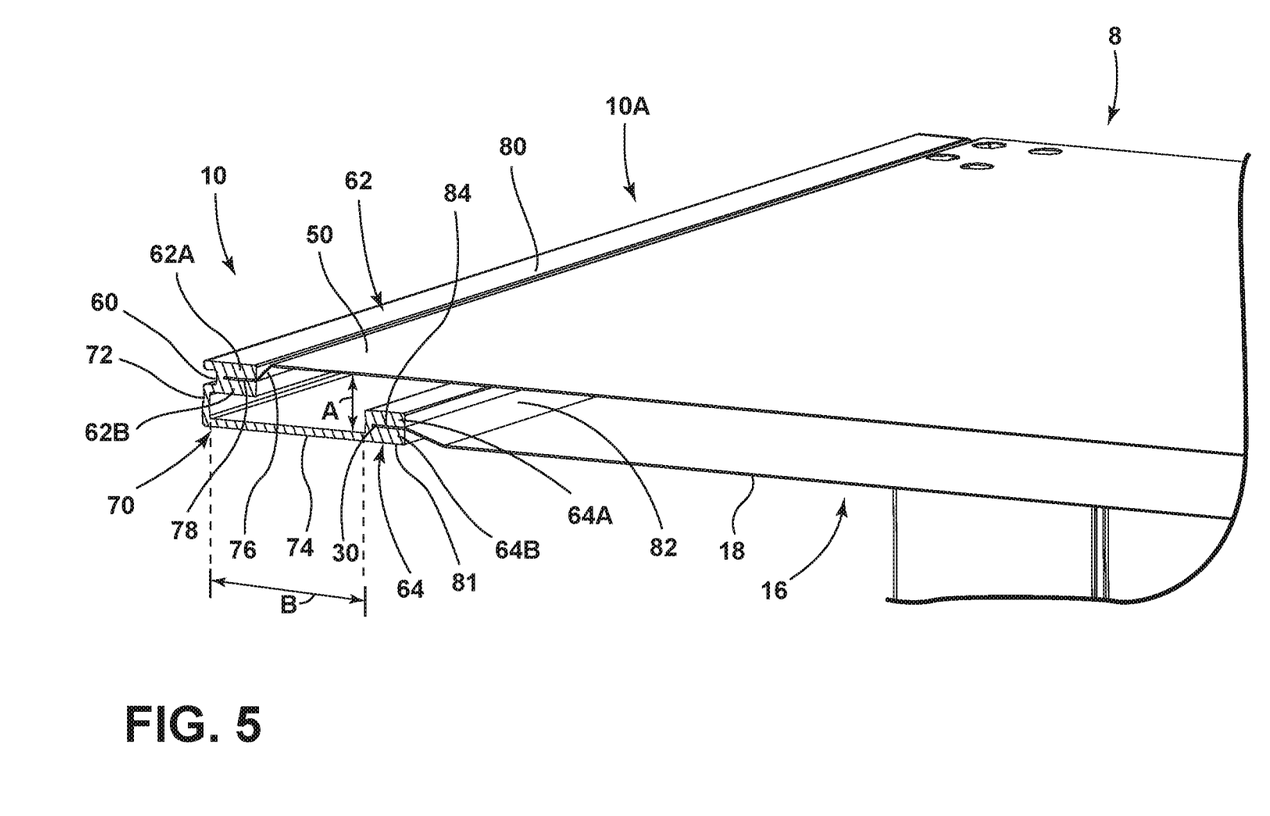
FIG. 5 is a fragmentary cross-sectional view of the thermal bridge taken from location V of FIG. 4.

Referring now to FIG. 5, an upper portion 10A of the thermal bridge 10 is shown having the outer coupling portion 62 disposed above the upper inner coupling portion 64. The outer coupling portion 62 is interconnected with the upper inner coupling portion 64 by a central wall or web 70 having both an upright portion 72 and a horizontal portion 74. As shown in FIG. 5, the outer coupling portion 62 is coupled to the upright portion 72 of the central wall or web 70, such that the outer coupling portion 62 is raised above the upper inner coupling portion 64. Further, the upper inner coupling portion 64 is staggered or offset relative to the outer coupling portion 62. Specifically, in the embodiment shown in FIG. 5, the upper inner coupling portion 64 is disposed inward and below the outer coupling portion 62 as disposed on an end of the horizontal portion 74 of the central wall or web 70. As shown in FIG. 5, the front edge 60 of the wrapper 8 may include an angled transverse wall 76 and an end flange portion 78 that is received in the outer coupling portion 62 of the thermal bridge 10. The angle of the transverse portion 76 of the wrapper 8 allows the top wall 50 of the wrapper 8 to be flush with an outer surface 80 of the thermal bridge 10, when the end flange portion 78 is received in the outer coupling portion 62 of the thermal bridge 10. The end flange portion 78 is contemplated to be part of the front edge 60 of the wrapper 8 that is received in the outer coupling portion 62 thereof for providing a surface for attachment of the outer coupling portion 62 at upper and lower contact surfaces 62A, 62B thereof. Similarly, the refrigerator liner 16 includes an angled transverse portion 82 extending off of top wall 18 thereof, and leading to an end flange portion 84 which is received in upper inner coupling portion 64. The angle of transverse portion 82 of the refrigerator liner 16 allows for the inner surface of top wall 18 to align with an inner surface 81 of the thermal bridge 10. With the front edge 30 of the refrigerator liner 16 received in the inner upper coupling portion 64, the end flange portion 84 provides a surface for the thermal bridge 10 to adhere to the refrigerator liner 16 at contact surfaces 64A, 64B at upper inner coupling portion 64. Thus, the front edge 60 of the wrapper 8 is not only spaced-apart from the front edge 30 of the refrigerator liner 16 so as to be outside of the front edge 30 of the refrigerator liner 16 (as indicated by arrow A), but is also offset laterally outward from the front edge 30 of the refrigerator liner 16 (as indicated by arrow B). Similarly, the thermal bridge 10 includes a staggered configuration for outer coupling portion 62 relative to the upper inner coupling portion 64 for receiving the front edge 60 of the wrapper 8 and the front edge 30 of the refrigerator liner 16. This staggered configuration is also present between the wrapper 8 and the freezer liner 32, as further described below.

Figure 6:
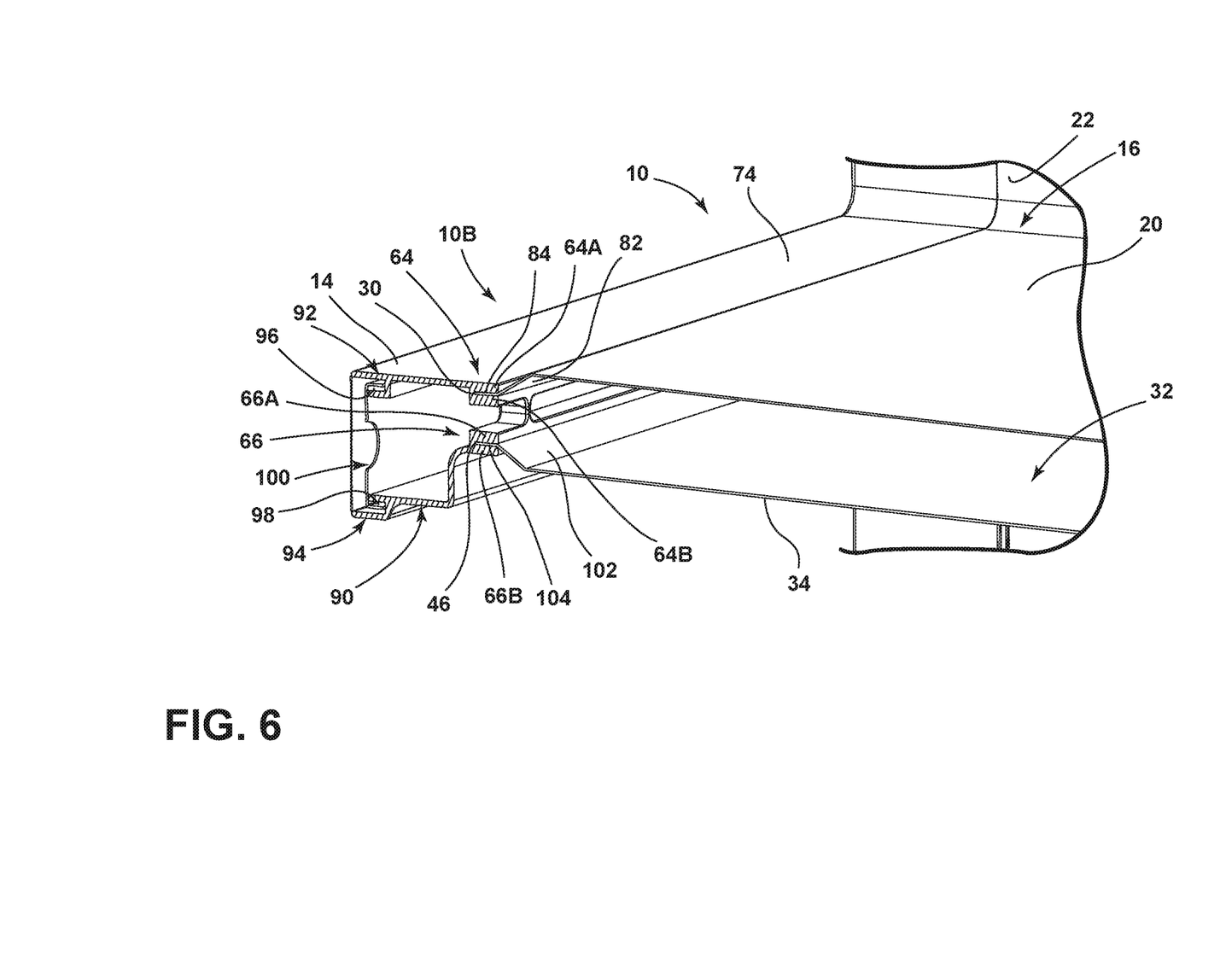
FIG. 6 is a fragmentary cross-sectional view of the thermal bridge taken from location VI of FIG. 4.

Referring now to FIG. 6, a middle portion 1013 of the thermal bridge 10 is shown having inner upper coupling portion 64 disposed above lower inner coupling portion 66. The lower inner coupling portion 66 is interconnected with the upper inner coupling portion 64 by a central wall or web 90. The web 90 includes outwardly opening upper and lower channels 92, 94 that are configured to a receive attachment flanges 96, 98 of a trim member 100. It is contemplated that the thermal bridge 10 may also be over molded to the trim member 100 in assembly. As further shown in FIG. 6, the upper inner coupling portion 64 is disposed above the lower inner coupling portion 66. Further, the upper inner coupling portion 64 is not staggered or offset relative to the lower inner coupling portion 66, but rather they are aligned with one another. In the embodiment shown in FIG. 6, the refrigerator liner 16 includes the transverse portion 82 extending off of bottom wall 20 thereof, and leading to the end flange portion 84 which is received in the upper inner coupling portion 64. Thus, the transverse portion 82 of the refrigerator liner 16 is disposed all the way around the opening 31 of the refrigerator liner 16 at top wall 18, bottom wall 20 and opposed side walls 22, 24 at front portions thereof. The end flange portion 84 is also disposed fully around the refrigerator liner 16 extending outwardly from transverse portion 82, and defining a surface for adhering engagement with contact surfaces 64A, 64B of the upper inner coupling portion 64 of the thermal bridge 10.

Similarly, the freezer liner 32 includes a transverse portion 102 extending off of top wall 34 thereof, and leading to an end flange portion 104 which is received in the lower inner coupling portion 66. Like the refrigerator liner, the transverse portion 102 of the freezer liner 32 is disposed all the way around the opening 47 of the freezer liner 32 at top wall 34, bottom wall 36 and opposed side walls 38, 40 at front portions thereof. The end flange portion 104 is also disposed fully around the freezer liner 32 extending outwardly from transverse portion 102, and defining a surface for adhering engagement with upper and lower contact surfaces 66A, 66B of the upper inner coupling portion 64 of the thermal bridge 10 which are overmolded to the end flange portion 104.

Figure 7:
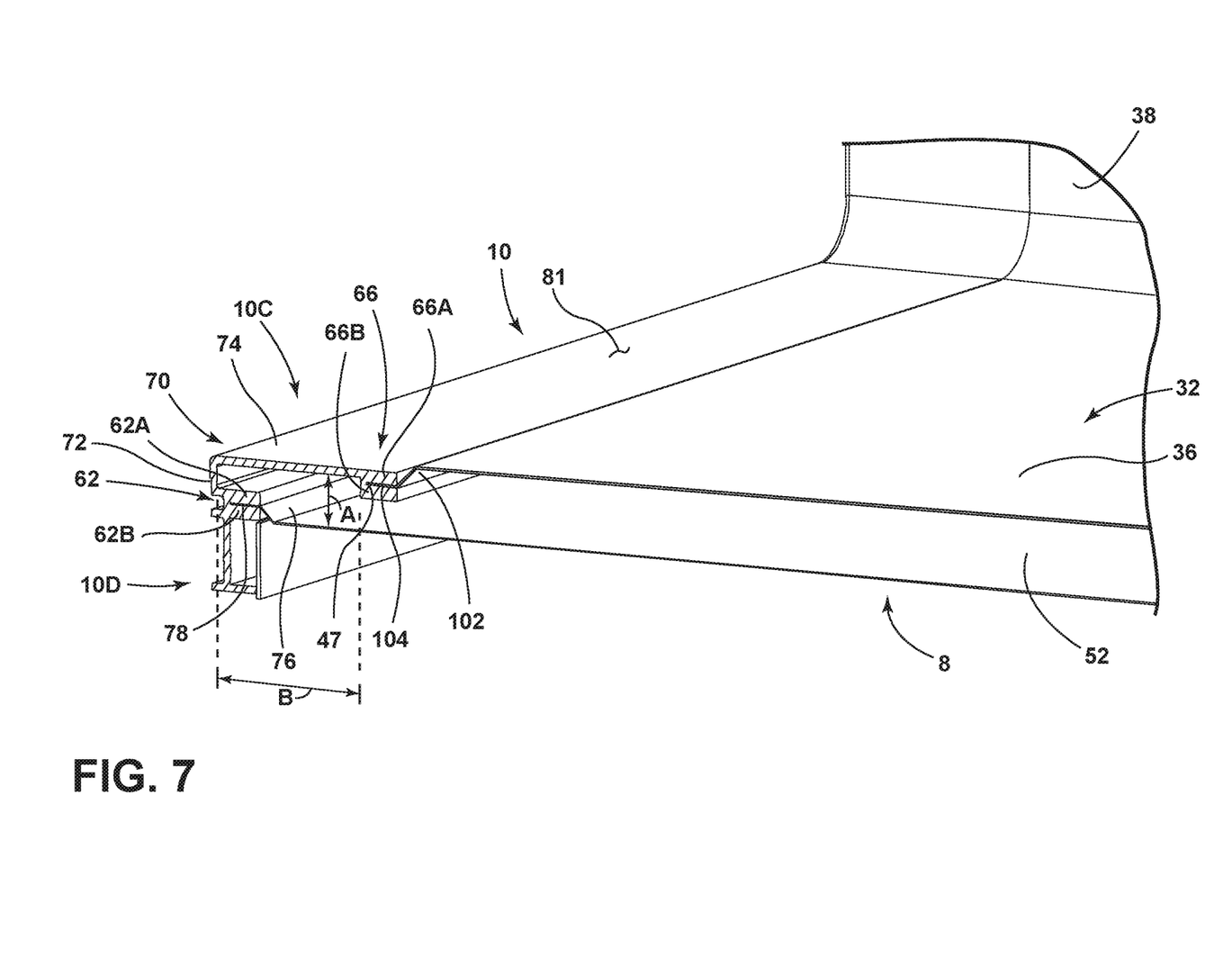
FIG. 7 is cross-sectional view of the thermal bridge taken from location VII of FIG. 4.

Referring now to FIG. 7, a lower portion 10C of the thermal bridge 10 is shown having the outer coupling portion 62 disposed below the lower inner coupling portion 66. The outer coupling portion 62 is interconnected with the lower inner coupling portion 66 by the central wall or web 70 having the upright portion 72 and the horizontal portion 74. As shown in FIG. 7, the outer coupling portion 62 is raised above the lower inner coupling portion 66. Further, the lower inner coupling portion 66 is staggered or offset relative to the outer coupling portion 62. Specifically, in the embodiment shown in FIG. 7, the lower inner coupling portion 66 is disposed inward and below the outer coupling portion 62 as disposed on an end of the horizontal portion 74 of the central wall or web 70. Thus, the staggered configuration of the outer coupling portion 62 and the lower inner coupling portion 66 is akin to the staggered configuration of the outer coupling portion 62 and the upper inner coupling portion 64 shown in FIG. 5. As further shown in FIG. 7, the angle of the transverse portion 102 of the freezer liner 32 allows the bottom wall 36 of the freezer liner 32 to be flush with an inner surface 81 of the thermal bridge 10, when the end flange portion 104 is received in the lower inner coupling portion 66 of the thermal bridge 10. Thus, the front edge 60 of the wrapper 8 is not only spaced-apart from the front edge 46 of the freezer liner 32 so as to be outside of the front edge 46 of the freezer liner 32 (as indicated by arrow A), but is also offset laterally outward from the front edge 46 of the freezer liner 32 (as indicated by arrow B). Similarly, the thermal bridge 10 includes a staggered configuration for outer coupling portion 62 relative to the lower inner coupling portion 66 for receiving the front edge 60 of the wrapper 8 and the front edge 46 of the freezer liner 32. In assembly, it is contemplated that the outer coupling portion 62 of the thermal bridge 10 is disposed outwardly (as indicated by arrow A shown in FIG. 5 and arrow A shown in FIG. 7) relative to the upper inner coupling portion 64 (FIG. 5) and the lower inner coupling portion 66 (FIG. 7). Further, the outer coupling portion 62 of the thermal bridge 10 is also offset in a laterally outward direction relative to the upper inner coupling portion 64 (FIG. 5) and the lower inner coupling portion 66 (FIG. 7) as indicated by arrow B in FIG. 5 and arrow B in FIG. 7.

Thus, as shown in FIGS. 5-7, the end flange portions 78, 84 and 104 of the wrapper 8, refrigerator liner 16, and freezer liner 32, respectively, include first and second outer contact surfaces on opposed sides thereof. These opposed contact surfaces of the end flange portions 78, 84 and 104 are enrobed or covered by a resin material used to form the contact surfaces 62A, 62B; 64A, 64B; and 66A, 66B of the thermal bridge 10 to adhere the thermal bridge 10 to the wrapper 8, refrigerator liner 16, and freezer liner 32, as further described below.

Figure 8:
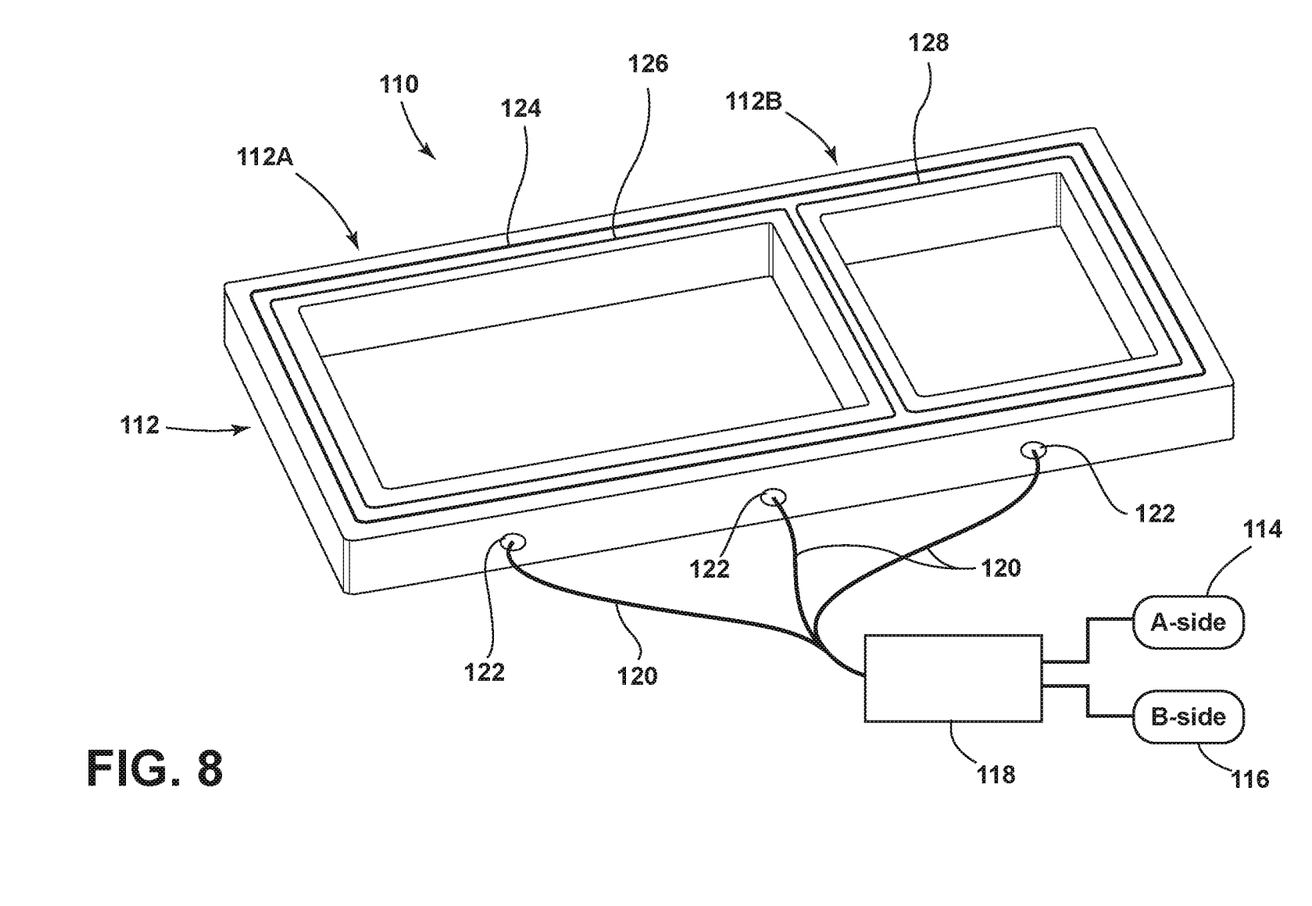
FIG. 8 is a top perspective view for making a mold form for making a thermal bridge breaker.

Referring now to FIG. 8, a mold 110 is shown having a body portion 112, wherein the body portion 112 includes first and second portions 112A, 112B. The first and second portions 112A, 112B of the body portion 112 of the mold 110 generally correspond to the locations of the refrigerator compartment 28 and freezer compartment 44 as configured in FIG. 3. The body portion 112 includes a mold cavity or mold form disposed in an interior thereof, wherein the mold cavity is a hollow space having an inverse configuration of the thermal bridge 10 for casting the thermal bridge 10 using the mold 110. Thus, the mold 110 is configured to receive a resin mixture for forming the thermal bridge 10 in the mold cavity therein. In the embodiment shown in FIG. 8, the mold 110 is contemplated for use with a RIM process, wherein A-side and B-side components 114, 116, respectively, are mixed in an impinging mixer 118 and dispersed into the mold cavity of the mold 110 through supply lines 120. Specifically, the supply lines 120 provide the mixture of the A-side component 114 and the B-side component 116 through access apertures 122 which provide access to the mold cavity of the mold 110. There are several methods known in the art for providing access to a cavity of a mold, all of which are contemplated for use with the present concept. The mold 110 is contemplated to be made of a metallic material, such as aluminum and is configured to be heated to facilitate the formation of the thermal bridge. The A-side and B-side components 114, 116 may be polyurethane reacting materials which mix in the impinging mixer 118 and are then introduced into the mold cavity of the heated mold 110 through supply lines 120 under pressure. The A-side and B-side components 114, 116 react with one another when mixed and expand in a mold cavity of the mold 110. The reaction mixture is then allowed to cure to form the final thermal bridge 10. The mold 110 may be cooled to facilitate the curing process. Once the thermal bridge 10 is formed, the mold 110 is removed to deliver the overmolded composite part. Generally, the A-side component 114 is an isocyanate containing material and the B-side component 116 is a polyol containing material which may include a variety of chain extenders, cross-linkers, catalyst, surfactants, blowing agents and other like components.

Figure 9:
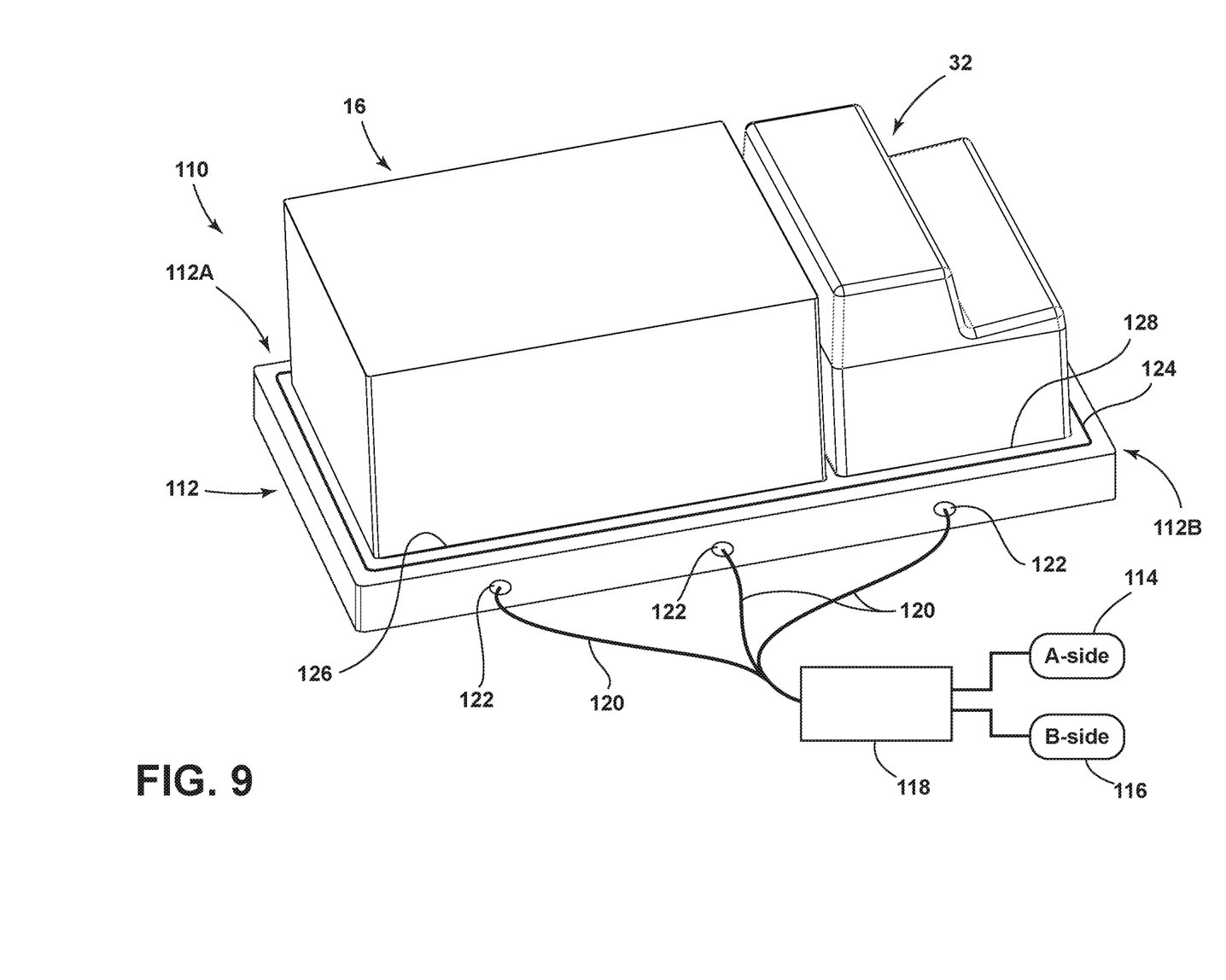
FIG. 9 is a top perspective view of the mold form of FIG. 8 showing a refrigerator liner and a freezer liner inserted into the mold form.

In the embodiment shown in FIG. 8, the body portion 112 of the mold 110 includes an outer channel 124 and first and second inner channels 126, 128. The channels 124, 126 and 128 are configured to receive components of the vacuum insulated cabinet structure 2 of the present concept for positioning within the mold 110 prior to the injection of a resin mixture used to form the thermal bridge 10. Specifically, outer channel 124 includes a configuration akin to the configuration of the front edge 60 of the wrapper 8 shown in FIG. 2. Similarly, the first and second inner channels 126, 128 include configurations similar to the front edges 30, 46 of the refrigerator liner 16 and the freezer liner 32, respectively, as shown in FIG. 2. In this way, the wrapper 8 and the liners 16, 32 can be positioned such that the front edges thereof are inserted into the mold cavity of the mold 110, as shown in FIG. 9. In FIG. 9, the refrigerator liner 16 and freezer liner 32 are inserted into the first and second channels 126, 128 of the mold 110 prior to the injection of the resin mixture into the mold cavity of the mold 110 for forming the thermal bridge 10 in an overmolding manner to connecting portions of the wrapper 8 and liners 16, 32.

Figure 10:
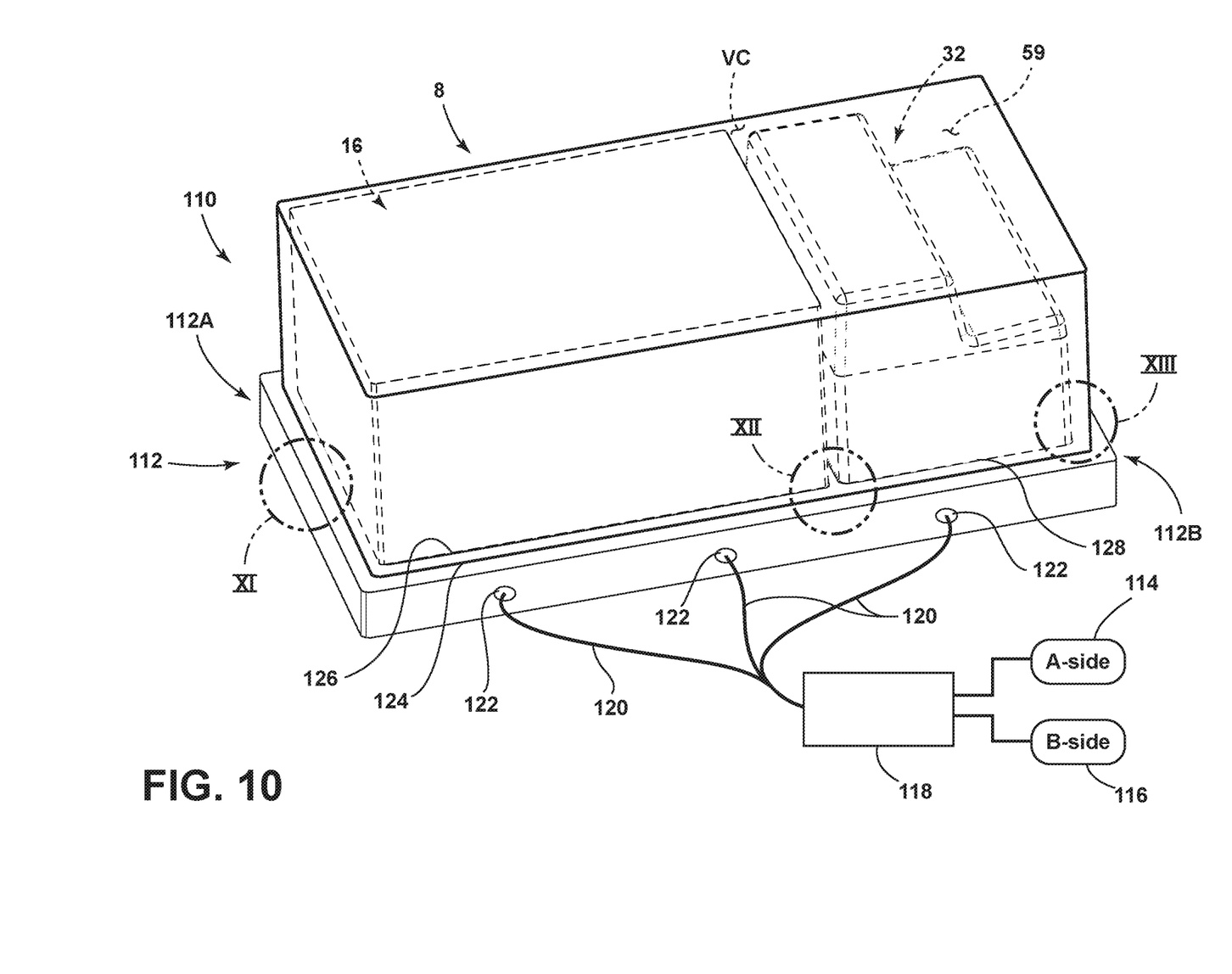
FIG. 10 is a top perspective view of the mold form of FIG. 9 with an exterior wrapper inserted into the mold form.

Referring now to FIG. 10, the wrapper 8 is shown inserted over the refrigerator liner 16 and freezer liner 32, such that the wrapper 8 is received in the outer channel 124 of the mold 110. In this way, the refrigerator liner 16 and the freezer liner 32 are received within the cavity 59 of the wrapper 8 to form the vacuum cavity VC of the vacuum insulated structure 2 shown in FIG. 3. Thus, in the embodiment shown in FIG. 10, the wrapper 8, refrigerator liner 16 and freezer liner 32 have portions thereof received within a mold cavity of the mold 110. In this way, the front edges 60, 30, and 46, of the wrapper 8, and liners 16, 32, are received either fully or partially within the mold cavity of the mold 110 prior to the injection of the resin mixture used to form the thermal bridge 10. Specifically the end flange portions 78, 84 and 104 of the wrapper 8, and liners 16, 32 are received in the mold cavity to define coupling surfaces for overmolding coupling portions of the thermal bridge 10 thereto.

Figure 11:
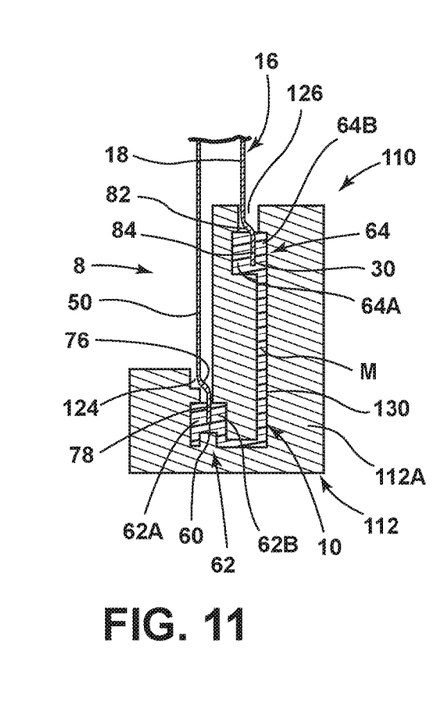
FIG. 11 is a cross-sectional view of the mold form of FIG. 10 taken at location XI.

Referring now to FIG. 11, the mold 110 is shown having a mold cavity 130 disposed within an interior of the body portion 112 of the mold 110. The mold cavity 130 is shown filled with a resin mixture M which is introduced into the mold cavity 130 under pressure from the impinging mixer 118 shown in FIG. 10. In FIG. 11, the first portion 112A of the mold 110 is shown having outer coupling portion 62 and upper inner coupling portion 64 of the thermal bridge 10 formed therein. The top wall 18 of the refrigerator liner 16 is shown inserted into the first inner channel 126 of the mold 110 for receiving the end flange portion 84 thereof within a portion of the mold cavity 130 used to form the upper inner coupling portion 64. As such, the upper and lower contact surfaces 64A, 64B surround or enrobe the end flange portion 84, such that the upper inner coupling portion 64 is overmolded to the front edge 30 of the refrigerator liner 16 at end flange portion 84. Similarly, the end flange portion 78 of the top wall 50 of the wrapper 8 is inserted into outer channel 124 of the mold 110 for positioning within the mold cavity 130 at a location configured to mold the outer coupling portion 62 of the thermal bridge 10. As the resin mixture M is added to the mold cavity 130, the upper and lower contact surfaces 62A, 62B form around the end flange portion 78, such that the outer coupling portion 62 is overmolded to the front edge 60 of the wrapper 8 at end flange portion 78. Thus, the overmolding of the thermal bridge 10 to the wrapper 8 and refrigerator liner 16 at upper portions thereof in the mold 110 provides for an upper portion 10A of the thermal bridge 10 depicted in FIG. 5 that has adhered to the end flange portions 78, 84 of the wrapper 8 and refrigerator liner 16, respectively.

Figures 12A, 12B, 13:
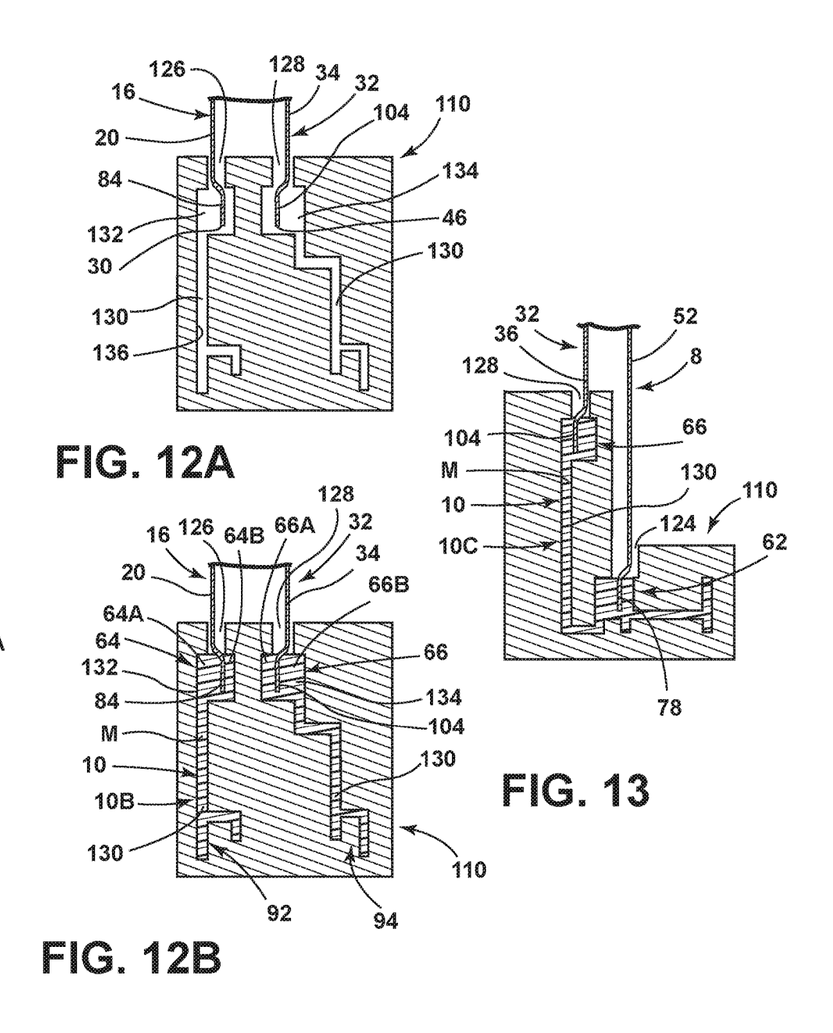
FIG. 12A is a cross-sectional view of the mold form taken at location XII.
FIG. 12B is a cross-sectional view of the mold form of FIG. 12A having a resin disposed within the mold form of the mold.
FIG. 13 is a cross-sectional view of the mold form of FIG. 10 taken at location XIII.

Referring now to FIG. 12A, the mold 110 is shown with the bottom wall 20 of the refrigerator liner 16 having the front edge 30 and end flange portion 84 thereof disposed within the mold cavity 130. The bottom wall 20 of the refrigerator liner 16 accesses the mold cavity 130 through the first inner channel 126 of the mold 110. As further shown in FIG. 12A, the front edge 46 and end flange portion 104 of the freezer liner 32 is shown inserted into the mold cavity 130 through second inner channel 128 of the mold 110. The front edges 30, 46 and end flange portions 84, 104 of the refrigerator liner 16 and freezer liner 32 are shown suspended within portions of the mold cavity 130 configured to form the upper and lower inner coupling portions 64, 66 as shown in FIG. 12B. The portions of the refrigerator liner 16 and freezer liner 32 disposed within the mold cavity 130 can be suspended within the mold cavity 130 using any number of sacrificial inserts placed within the mold cavity 130 prior to the insertion of the front edges 30, 46 of refrigerator liner 16 and freezer liner 32 into the mold cavity 130. As specifically illustrated in FIG. 12A, the mold cavity 130 includes sidewalls 136 that are used to define the outer surfaces of the thermal bridge 10 after a resin mixture M is injected into the mold cavity 130 and allowed to cure therein. Thus, once the components (such as the wrapper 8 and liners 16, 32) have been inserted into the mold 110 at the respective channels thereof, an overmolding resin composition M is introduced into the heated mold cavity 130 in a molten form. In this way, the previously formed wrapper 8, refrigerator liner 16 and freezer liner 32 are adhered together with the thermal bridge 10 by overmolding portions of the thermal bridge 10 to contact surfaces of the pre-formed components.

With reference to FIG. 12B, the middle portion 10B of the thermal bridge 10 is formed as the resin mixture M is introduced into the mold cavity 130. Specifically, portions 132, 134 of the mold cavity 130 are configured to form the upper and lower inner coupling portions 64, 66 with contact surfaces 64A, 64B and 66A, 66B which enrobe, surround, and adhere to end flange portions 84, 104 of the refrigerator liner 16 and freezer liner 32 in an overmolding procedure. The middle portion 10B of the thermal bridge 10 formed in the portion of the mold 110 shown in FIG. 12B is illustrated in FIG. 6.

With reference to FIG. 13, the mold 110 is shown having the mold cavity 130 configured for forming the lower portion 10C of the thermal bridge 10 that is illustrated in FIG. 7. End flange portions 78, 104 of the wrapper 8 and freezer liner 32 are shown overmolded within outer coupling portion 62 and lower inner coupling portion 66, respectively. In the embodiments shown in FIGS. 11-13, portions of the mold 110 are shown having mold form cavity configurations used to overmold to portions of the wrapper 8, refrigerator liner 16, and freezer liner 32 for forming a unitary overmolded composite structure 2 as shown in FIG. 3. It is contemplated that the overmolding of the end flange portions of these components is continuous throughout the cavity 130 of the mold 110, such that a hermetic airtight seal is formed between the thermal bridge 10 and the wrapper 8, refrigerator liner 16 and freezer liner 32. In this way, the vacuum cavity VC (FIGS. 3 and 10) is an airtight cavity which can hold a vacuum necessary providing a vacuum insulated cabinet structure 2.

Thus, the present concept further includes a method of making a cabinet structure, wherein the method includes the following steps: a) forming a wrapper 8 from a sheet of material, preferably sheet metal, whereby the wrapper 8 has an opening 61 and a front edge 60 extending around the opening 61 (FIG. 2); b) forming a first liner 16 from a sheet of material, preferably sheet metal, whereby the first liner 16 has an opening 31 and a front edge 30 extending around the opening 31 of the first liner 16 (FIG. 2); c) forming a second liner 32 from a sheet of material, preferably sheet metal, whereby the second liner 32 has an opening 47 and a front edge 46 extending around the opening 47 of the second liner 32 (FIG. 2); d) providing a mold 110 having a body portion 112 with an outer channel 124 and first and second inner channels 126, 128, wherein all channels 124, 126, and 128 open into a mold cavity 130 disposed within an interior of the body portion 112, the mold cavity 130 having an inverse configuration of a thermal bridge (FIG. 8); e) positioning the front edge 30 of the first liner 16 in the first inner channel 126 of the mold 110 whereby the front edge 30 of the first liner 16 is partially disposed within the mold cavity 130 of the mold 110 through the first inner channel 126 of the mold 110 (FIGS. 9 and 12A); f) positioning the front edge 46 of the second liner 32 in the second inner channel 128 of the mold 110 whereby the front edge 46 of the second liner 32 is partially disposed within the mold cavity 130 of the mold 110 through the second inner channel 128 of the mold 110 (FIGS. 9 and 12A); g) positioning the front edge 60 of the wrapper 8 in the outer channel 124 of the mold 110 whereby the front edge 60 of the wrapper 8 is partially disposed within the mold cavity 130 of the mold 110 through the outer channel 124 of the mold 110 (FIGS. 10, 11 and 13); h) introducing a resin mixture M into the mold cavity 130 to substantially fill the mold cavity 130 (FIG. 12B); and i) forming a thermal bridge 10 from the resin mixture M within the mold cavity 130, the thermal bridge 10 including an outer coupling portion 62 overmolded to a portion of the front edge 60 of the wrapper 8, a first inner coupling portion 64 overmolded to a portion of the front edge 30 of the first liner 16, and a second inner coupling portion 66 overmolded to a portion of the front edge 46 of the second liner 32 (FIGS. 3 and 5-7).

What is claimed is:

1. An overmolded composite structure, comprising:
a wrapper having an opening that opens into a cavity and a front edge extending around the opening, wherein the front edge of the wrapper includes an angled transverse portion and an end flange portion having inner and outer surfaces;
at least one liner having an opening that opens into a compartment and a front edge extending around the opening of the liner, wherein the front edge of the at least one liner includes an angled transverse portion and an end flange portion having inner and outer surfaces, and wherein the liner is disposed inside the cavity of the wrapper, such that the front edge of the at least one liner is disposed inside of the front edge of the wrapper, and further wherein the front edge of the at least one liner is inwardly recessed relative to the front edge of the wrapper; and
a thermal bridge having an outer coupling portion surrounding at least one inner coupling portion, wherein the outer coupling portion includes upper and lower contact surfaces engaged with the outer and inner surfaces of the end flange portion of the wrapper, respectively, and further wherein the inner coupling portion includes upper and lower contact surfaces engaged with the outer and inner surfaces of the end flange portion of the at least one liner, respectively, and further wherein the angled transverse portion of the wrapper aligns an outer surface of the wrapper with an outer surface of the thermal bridge when the end flange portion of the wrapper is received in the outer coupling portion of the thermal bridge, and further wherein the angled transverse portion of the at least one liner aligns an inner surface of the at least one liner with an inner surface of the thermal bridge when the end flange portion of the at least one liner is received in the inner coupling portion of the thermal bridge.

2. The overmolded composite structure of claim 1, wherein the at least one liner includes first and second liners.

3. The overmolded composite structure of claim 2, wherein the at least one inner coupling portion includes first and second inner coupling portions.

4. The overmolded composite structure of claim 3, wherein the first and second inner coupling portions are operably coupled to front edges of the first and second liners.

5. The overmolded composite structure of claim 2, wherein the first liner is disposed above the second liner.

6. The overmolded composite structure of claim 2, wherein the first and second liners are made from a sheet metal material.

7. The overmolded composite structure of claim 6, wherein the exterior wrapper is made from a sheet metal material.

8. The overmolded composite structure of claim 7, wherein the thermal bridge is made from a polyurethane material.

9. A vacuum insulated cabinet structure, comprising:
an exterior wrapper having a front edge extending around an opening thereof;
a liner having a front edge extending around an opening of the liner, wherein the liner is disposed inside of the wrapper with the front edge of the wrapper disposed around the front edge of the liner; and
a thermal bridge having a web with an upright portion and a horizontal portion, an outer coupling portion is disposed on the upright portion of the web and an inner coupling portion is disposed on the horizontal portion of the web, wherein the outer coupling portion is overmolded to at least a portion of the front edge of the wrapper, and the inner coupling portion is overmolded to at least a portion of the front edge of the liner to form a sealed vacuum cavity between the wrapper and the liner, and further wherein the outer coupling portion is parallel to and outwardly offset relative to the at least one inner coupling portion.

10. The vacuum insulated cabinet structure of claim 9, wherein the front edge of the at least one liner includes an end flange portion having first and second contact surfaces.

11. The vacuum insulated cabinet structure of claim 10, wherein the at least one inner coupling portion includes first and second contact surfaces partially disposed over and adhered to the first and second contact surfaces of the end flange portion of the at least one liner.

12. The vacuum insulated cabinet structure of claim 9, wherein the front edge of the exterior wrapper includes an end flange portion having first and second contact surfaces.

13. The vacuum insulated cabinet structure of claim 12, wherein the outer coupling portion includes first and second contact surfaces partially disposed over and adhered to the first and second contact surfaces of the end flange portion of the exterior wrapper.

14. A vacuum insulated cabinet structure, comprising:
a thermal bridge having an outer coupling portion that is parallel to and surrounds and inner coupling portion, wherein the inner coupling portion is inwardly offset relative to the outer coupling portion by an inwardly extending portion of an interconnecting web;
a wrapper having an opening that opens into a cavity and a front edge extending around the opening, wherein the front edge of the wrapper is operably coupled to the outer coupling portion, and further wherein the front edge of the wrapper includes an angled transverse portion and an end flange portion, and further wherein the angled transverse portion of the wrapper aligns an outer surface of the wrapper with an outer surface of the thermal bridge when the end flange portion of the wrapper is coupled to the outer coupling portion of the thermal bridge;
at least one liner having an opening that opens into a compartment and a front edge extending around the opening of the at least one liner, wherein the liner is disposed inside the cavity of the wrapper, such that the front edge of the at least one liner is disposed inside of the front edge of the wrapper, and further wherein the front edge of the at least one liner is inwardly recessed relative to the front edge of the wrapper.

15. The vacuum insulated structure of claim 14, wherein the front edge of the wrapper includes inner and outer surfaces.

16. The vacuum insulated structure of claim 15, wherein the outer coupling portion includes upper and lower contact surfaces.

17. The vacuum insulated structure of claim 16, wherein the upper and lower contact surfaces of the outer coupling portion are operably coupled to the inner and outer surfaces of the front edge of the wrapper.

18. The vacuum insulated structure of claim 17, wherein the front edge of the at least one liner includes inner and outer surfaces.

19. The vacuum insulated structure of claim 18, wherein the inner coupling portion includes upper and lower contact surfaces.

20. The vacuum insulated structure of claim 19, wherein the upper and lower contact surfaces of the inner coupling portion are operably coupled to the inner and outer surfaces of the front edge of the at least one liner.

* * * * *